Sept. 30, 1969          W. A. AYRES          3,469,452

CLINICAL THERMOMETER WITH NON-METALLIC LIQUID MEDIUM

Filed Jan. 2, 1968

INVENTOR
WALDEMAR A. AYRES
BY
Kane, Dalsimer, Kane, Sullivan + Smith
ATTORNEYS

United States Patent Office 3,469,452
Patented Sept. 30, 1969

3,469,452
CLINICAL THERMOMETER WITH NON-METALLIC LIQUID MEDIUM
Waldemar A. Ayres, Rutherford, N.J., assignor to Becton, Dickinson and Company, Rutherford, N.J., a corporation of New Jersey
Filed Jan. 2, 1968, Ser. No. 695,269
Int. Cl. G01k 1/04
U.S. Cl. 73—371                               11 Claims

ABSTRACT OF THE DISCLOSURE

A maximum reading constriction type clinical thermometer having a non-metallic thermal liquid medium within its bore. The liquid medium displaying a greater surface tension or energy than that of the immediate containing surface thereby obviating wetting of the same by the liquid medium.

BACKGROUND OF THE INVENTION

Clinical thermometers of the maximum reading type are known to the art. It is also known that thermometers of this type include within the bore, usually near the bulb, a constriction through which the contained thermal medium must pass when greater or increasing forces are experienced within the bulb due to a rise in temperature. According to present information mercury, to the exclusion of other fluids, is used in the maximum reading clinical thermometer of the constriction type.

While thermometers of this type are presently well recognized commercially and, in fact, the standard within the industry they are not without their drawbacks. Thus, the present day maximum reading thermometers employ a fluid medium, i.e., mercury, which is not only expensive, adding to the cost of thermometer production and the individual product, but also, due to its visual characteristics, one which is difficult to locate while within the relatively small stem bore, thereby causing difficulty in locating the column head which is indicative of the temperature to be read. Readability or visibility cannot be improved since mercury is not, as far as present knowledge is concerned, capable of being dyed or otherwise colored.

SUMMARY OF THE INVENTION

The present invention seeks to overcome the aforementioned disadvantages and in a broad sense is directed to a clinical thermometer of the maximum reading type including a stem provided with temperature indicia and a bore of substantially constant cross-section extending generally the length of the stem and parallel to its axis; a bulb formed at one end of the stem in communication with the bore; a constriction within the bore adjacent the bulb; and a non-metallic, non-wetting, heat responsive liquid medium within the bore which, upon increases in internal bulb temperature and pressure, rises in the bore and past the constriction. The constriction maintains the column head, representative of the temperature to be read, at a maximum position within the bore and due to the greater relative surface tension of the medium with respect to the containing bore or bore film surface, wetting of the same is prevented.

Thus, it is an object of the invention to provide in a maximum reading constriction type thermometer, a non-metallic thermal liquid medium which, in combination with its containing surface, does not wet.

Another object is to provide a thermometer of the discussed type which will be commercially acceptable and which employs a non-metallic liquid medium that is both readily obtainable and relatively inexpensive thereby to reduce the production costs of the thermometer, and, further, which may be colored to aid in visual readability.

Other objects and advantages of the present invention will become clear to those skilled in the art as the following description, to be read in conjunction with the drawing figures, is developed.

BRIEF DESCRIPTION OF THE DRAWING

The accompanying drawing illustrates the preferred embodiment of the present invention and forms a part of the present disclosure. By this drawing.

BRIEF DESCRIPTION OF THE PREFERRED EMBODIMENT

Figure 1:
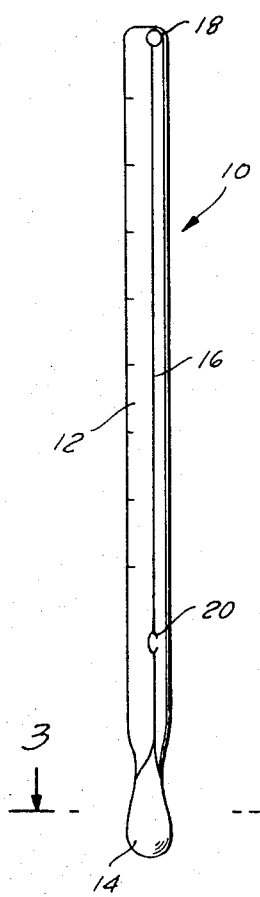
FIGURE 1 is an elevational view of a clinical thermometer.

In the drawing, particularly FIG. 1, the improved maxium reading clinical thermometer, generally represented by the numeral 10, is shown. The thermometer includes a temperature calibrated glass stem 12 (calibration markings less temperature readings, are shown), a bulb 14 at one end of the stem in which the thermal liquid medium is stored and a bore 16 which extends throughout substantially the stem length and communicates with the bulb. The bore, further, is generally parallel to the stem axis. Optionally, a chamber 18 is carried at the other end of bore 16 and functions, if a vapor or gas is used above the thermal liquid column, as a compression chamber to reduce the change of gas or vapor pressure when the thermal liquid is at various different heights for different temperatures. Conventionally, the maximum reading clinical thermometer 10 has a constriction 20, best shown in FIG. 2, in the bore. Preferably the constriction is located in close proximity to the bulb.

The manner and method which may be commercially employed to form the bore constriction, as illustratively shown in the figures, does not fall within the bounds of the present invention and, therefore, will not be discussed in any detail. There is the need, however, for a short discussion as to the necessity for and the function of a construction in a thermometer of the discussed type.

Thus, the constriction permits the passage of liquid medium from the bulb reservoir through the constricted length 22 in response to increased forces within the bulb caused by differential expansion between the glass and liquid. This condition causes the medium to seek a column level which is maintained constant by means of the constriction even though the sensed temperature falls below the maximum having been recorded. This is because the downward pressure on the column head is insufficient to overcome the surface tension forces of the fluid at the constriction which oppose any downward column movement. Rapid shaking of the thermometer is commonly employed to return the medium to the bulb. The constriction, additionally, in part functions to prevent downhill slippage or slide off of the medium (away from the bulb) if the top of the thermometer is tilted in a downward direction. Thus, the portion of the constriction adjacent the constricted opening 22 as well as the portion 24 opposite thereto and within the closed passage together with the reduction in cross-sectional area at the bore 16 provide gripping surfaces or roots for the column, thereby essentially maintaining stability. Additionally, the reduced passage acts as a second constriction to prevent, by surface tension forces, the medium from passing into the bore unless under the influence of a temperature increase.

Figure 2:
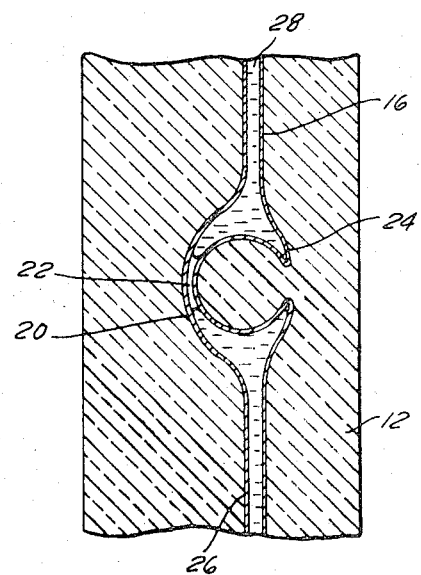
FIGURE 2 is a fragmentary view in cross-section showing the stem bore, constriction and thermal liquid medium therein.
Figure 3:
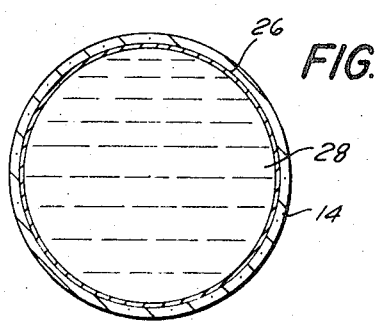
FIGURE 3 is a view in cross-section as seen along the line 3—3 in FIG. 1.

A surface coating or film 26, see FIGS. 2 and 3, is shown as being provided within the bulb and along the total bore length, including the constriction. As may be apparent a total coating, as discussed, is not necessary but it is necesary to coat the bore within and above the constriction. The coating and its application will be discussed below in relation to a preferred example. For present discussion purposes the coating is a material that displays a certain surface energy characteristic in the solid or deposited condition. This surface energy will be relatively low in relation to the surface tension of the contained liquid medium. In the preferred embodiment the coating is relatively thin in cross-section and for all purposes may be considered a film which does not significantly decrease the overall cross-sectional dimension of the stem bore 16, yet provides a continuous surface whose energy is less than the glass of the thermometer blank.

A liquid medium 28 is confined within the bore and bulb. As previously discussed, due to hydrostatic pressure changes within the latter the contained liquid medium rises within the bore until its column head locates at an equilibrium position which is indicative of the temperature being sensed. The column head is representative of the maximum temperature and due to the constriction remains at the maximum level.

To carry out the foregoing, the liquid medium characteristically has a surface tension or energy which is greater than the surface energy displayed by the stem bore surface or the deposited film 26. Thus, the medium does not wet its immediate containing surface.

Wetting, as may be well-known, is an intersurface phenomenon. It is the tendency of a contacting liquid to spread upon or wet a surface whose surface energy is higher than the surface energy or surface tension of that liquid. If the reverse situation is true no wetting or spreading of the liquid will occur.

The selected liquid should preferably have the following characteristics. It should be, as well as non-wetting, thermally responsive to temperature increases within the bulb and should have a substantially high expansion coefficient. It should have a high surface tension relative to the surface energy of the immediately containing surface, whether this surface is the bore surface or a supporting film. Additionally, it should be a liquid within the useful range of the thermometer; and both rapidly expand and contract linearly over the operating range of the thermometer. Further, and of prime importance the liquid medium should be non-metallic and preferably non-toxic.

In the general overall manufacture of the thermometer of the present invention, the following is intended to outline principal steps in a standard production technique that are both well-known to the art and considered appropriate as modified according to the invention.

Thus, a standard glass blank with a preformed bore and of a length substantially equivalent to the length of two commercial units is, by conventional blowing techniques, provided with a bubble, which during the process receives the bulb or reservoir. This bubble is formed generally within the central area of the blank. Adjacent thereto and on opposed sides of the central bubble, additional bubbles, of relatively smaller cross-section, are similarly created. The former defines a part of the thermometer bulb while the latter are ultimately acted upon to provide a bore constriction, the function of which is as previously discussed. Once the bubbles have been formed the total blank is cut in the region of the center bubble.

Coating 26 may now, or at a convenient time after the constriction is formed and in the same manner, be applied to coat uniformly the bore surface of the glass blank. This coating should be inert to the liquid to be supplied to the bore and in contact with the bore surface.

The coating may be applied to the bore surface in the following manner. Initially, air having a high moisture (water) content is blown or otherwise passed through the bore length of the stock thereby to substantially uniformly coat the contacting surface with adsorbed molecules of water. Thereafter, vapor of Dri-Film, an organosilicon material and a product of the General Electric Company, is uniformly blown through the moisture coated bore of the thermometer blank. The vapor and water react within the blank and along the total bore surface during blowing and the reactant solid forms a substantially continuous and uniform surface having a surface energy which is lower than the surface tension of the to-be-contained liquid medium.

A bulb is fused on the blank and the unit is treated within a chamber under elevated temperature and vacuum to age or cure the blank. In this manner all or substantially all air is drawn from the bulb and bore of the thermometer. For this operation the individual blanks are usually supported within a pan or other suitable container with the bulb end up. Once evacuation, baking and cooling have been completed the liquid medium is introduced into the bore and bulb. This is easily accomplished by allowing the liquid to pass into and fill the container to a level so that the ends of the blanks are immersed. By increasing the pressure within the chamber the liquid is forced within the bore in an amount to completely fill the bulb and bore. In this instance the liquid medium which is used is ethylene glycol, a material which will enter the bore under increased pressure yet will not wet the coated bore surface since its characteristic surface tension is greater than the surface energy displayed by the coated bore.

Once the blank is filled the thermometer is sealed and provided with a top chamber to accommodate liquid medium in excess of that needed for calibration. Then the constriction is formed, as already discussed, and the top chamber is removed thereby forming a commercial maximum reading clinical thermometer having a non-metallic and non-wetting fluid medium. The foregoing outlines principal modifications of well-known techniques of thermometer manufacture.

As previously mentioned, the coating 26 may be applied after the constriction, rather than before the constriction is formed. Thus, the constriction may be formed before the blank is sealed and, at that point in the total operation, the bore may be coated, as discussed previously.

It has also been found that the bore of the blank, as discussed, may be coated with other materials which display low surface energy characteristics, low in relation to the surface tension of the confined liquid medium, and that other liquid media may likewise be suitably employed in the non-metallic, non-wetting clinical thermometer.

Thus, the bore may be coated with a material known in the trade as Zepal, a fluorocarbon sold by Du Pont, or other fluorocarbons, as for example, perfluorolauric acid $(F_3C(CF_3)_{10}C'OOH)$ having a surface energy of only 6 dynes per cm. at 20° C. or any of the polymeric solids, and the fluorocarbon, hydrocarbon, chlorocarbon or nitrated hydrocarbon surfaces as discussed on pp. 20 and 21 of "Contact Angle, Wettability, and Adhesion," Advances in Chemistry Series 43, 1964. All of these materials display a surface energy of from 6–45 dynes per cm. at 20° C. which is significantly below the surface tension of, for example, water (72.8 dynes per cm. at 20° C.).

The Zepal substance may be blown through the bore in quantities sufficient to provide a uniformly coated bore surface throughout. Similarly, the bore may be coated by blowing or otherwise passing a microcrystalline wax-like substance dissolved in a carrier, such as carbon tetrachloride, etc. through the bore to form a continuous low surface energy coating once the carrier is allowed to evaporate. As used herein, "low" means a surface energy which is lower than the surface tension of the confined fluid medium.

The foregoing coatings may confine the ethylene glycol medium, as discussed, or any one of glycerine, water, or other suitable non-metallic liquid, each of which may or may not be dyed or otherwise colored to aid in thermometer readability. It should be stated that if the liquid medium has a relatively high vapor pressure the thermometer bore above the liquid may contain a gas to prevent loss by evaporation. In this case the use of chamber 18 can minimize the change of gas pressure when the thermosensitive liquid is at various different heights corresponding to different temperatures being measured.

From the foregoing it should be apparent that the objects and advantages as heretofore stated are carried out. While a preferred embodiment of the invention has been discussed this discussion has been for the purpose solely of illustration and it is not intended to be of a limiting nature for many modifications of the invention which may now be apparent to those skilled in the art are considered to be covered by and fall within the confines of the invention.

What is claimed is:

1. A clinical thermometer for maximum temperature readings comprising a capillary tube provided with temperature indicia and having a constant cross-sectional bore extending substantially the length of and generally parallel to the axis of said tube, a bulb, said bulb being formed at one end of said tube and in communication with said bore, a constriction in said bore adjacent said bulb, and a thermal responsive non-metallic liquid medium in said bulb and bore which is capable of movement through said constriction thereby to form a column of medium thereabove which is maintained by the constriction so that the column head indicates said maximum temperature, said bore surface defined by a material forming a continuous film-like coating having a surface energy which is less than the surface tension of said liquid medium thereby to prevent wetting of the treated bore surface by said liquid medium.

2. The clinical thermometer of claim 1 wherein said liquid medium has added thereto dye color to provide enhanced visual contrast with said capillary tube.

3. The clinical thermometer of claim 1 wherein said non-metallic liquid medium is glycerine.

4. The clinical thermometer of claim 1 wherein said non-metallic liquid medium is ethylene glycol.

5. The clinical thermometer of claim 1 wherein said non-metallic liquid medium is water.

6. The clinical thermometer of claim 1 wherein said film-like coating is formed of a wax-like material.

7. The clinical thermometer of claim 1 wherein said film-like coating is formed of an organo-silicon material.

8. The clinical thermometer of claim 1 wherein said containing surface is defined by a fluorocarbon film.

9. The clinical thermometer of claim 1 wherein said containing surface is defined by a hydrocarbon film.

10. The clinical thermometer of claim 1 wherein said containing surface is defined by a chlorocarbon film.

11. The clinical thermometer of claim 1 wherein said containing surface is defined by a nitrated hydrocarbon film.

References Cited

UNITED STATES PATENTS 626,124   5/1899   Yankauer _____ 73—371

LOUIS R. PRINCE, Primary Examiner

WILLIAM A. HENRY II, Assistant Examiner